US007114841B2

(12) United States Patent
Aanegola et al.

(10) Patent No.: US 7,114,841 B2
(45) Date of Patent: Oct. 3, 2006

(54) PARALLEL/SERIES LED STRIP

(75) Inventors: Srinath K. Aanegola, Broadview Heights, OH (US); Mathew Sommers, Sagamore Hills, OH (US); Matthew Mrakovich, Streetsborough, OH (US); Christopher L. Bohler, North Royalton, OH (US); Michael McCoy, Strongsville, OH (US)

(73) Assignee: GELcore LLC, Valley View, OH (US)

( * ) Notice: Subject to any disclaimer, the term of this patent is extended or adjusted under 35 U.S.C. 154(b) by 144 days.

(21) Appl. No.: 10/805,931

(22) Filed: Mar. 22, 2004

(65) Prior Publication Data

US 2005/0207151 A1 Sep. 22, 2005

(51) Int. Cl.
*H01R 33/00* (2006.01)
*H02G 3/04* (2006.01)

(52) U.S. Cl. ....................... 362/640; 362/249; 439/460

(58) Field of Classification Search ................ 362/249, 362/252, 238, 640; 439/460
See application file for complete search history.

(56) References Cited

U.S. PATENT DOCUMENTS

| | | | |
|---|---|---|---|
| 671,338 | A | 4/1901 | Halford |
| 3,115,541 | A | 12/1963 | Hanner et al. |
| 4,173,035 | A | 10/1979 | Hoyt |
| 4,419,538 | A | 12/1983 | Hansell, III |
| 4,631,650 | A | 12/1986 | Ahroni |
| 4,638,117 | A | 1/1987 | Ney |
| 4,777,573 | A | 10/1988 | Liao |
| 4,779,177 | A | 10/1988 | Ahroni |
| 4,807,098 | A | 2/1989 | Ahroni |
| 4,813,883 | A | 3/1989 | Staley |
| 4,815,814 | A | 3/1989 | Ulijasz |
| 4,855,882 | A | 8/1989 | Boss |
| 4,899,266 | A | 2/1990 | Ahroni |
| 4,984,999 | A | 1/1991 | Leake |
| 5,010,463 | A | 4/1991 | Ross |
| 5,051,877 | A | 9/1991 | Liao |
| 5,109,324 | A | 4/1992 | Ahroni |
| 5,121,310 | A | 6/1992 | Ahroni |
| 5,141,449 | A | 8/1992 | Tieszen |
| 5,154,508 | A | 10/1992 | Ahroni |
| 5,238,424 | A | 8/1993 | Vindum |

(Continued)

FOREIGN PATENT DOCUMENTS

WO WO 02/097770 A2 * 5/2002

(Continued)

OTHER PUBLICATIONS

International Search Report from PCT/US05/07836.

(Continued)

*Primary Examiner*—Sandra O'Shea
*Assistant Examiner*—James W Cranson, Jr.
(74) *Attorney, Agent, or Firm*—Fay, Sharpe, Fagan, Minnich & McKee, LLP

(57) ABSTRACT

An LED light engine includes a flexible electrical cable and a plurality of LEDs. The flexible electrical cable includes first, second and third electrical conductors and an electrically insulating covering for the electrical conductors. The conductors are arranged substantially parallel with one another having an insulating material therebetween. A first LED including a first lead electrically connects to the first electrical conductor and a second lead of the first LED electrically connects to the second conductor. A second LED includes a first lead electrically connected to the second electrical conductor and a second lead electrically connected to the third electrical conductor. A third LED includes first and second leads electrically connected to the second conductor. The third LED is interposed between the first LED and the second LED.

20 Claims, 7 Drawing Sheets

U.S. PATENT DOCUMENTS

| | | | | |
|---|---|---|---|---|
| 5,330,368 | A | 7/1994 | Tsuruzono | |
| 5,337,225 | A | 8/1994 | Brookman | |
| 5,367,122 | A | 11/1994 | De Olano | |
| 5,526,250 | A | 6/1996 | Ting et al. | |
| 5,559,681 | A | 9/1996 | Duarte | |
| 5,584,567 | A | 12/1996 | Rumpel | |
| 5,601,448 | A | 2/1997 | Poon | |
| 5,829,865 | A | 11/1998 | Ahroni | |
| 5,934,930 | A | 8/1999 | Camps et al. | |
| 5,967,823 | A | 10/1999 | Tsui | |
| 6,017,241 | A | 1/2000 | Komai | |
| 6,079,848 | A | 6/2000 | Ahroni | |
| 6,095,847 | A | 8/2000 | Lin | |
| 6,116,944 | A | 9/2000 | Tseng | |
| 6,261,119 | B1 | 7/2001 | Green | |
| 6,290,365 | B1 | 9/2001 | Schlesinger | |
| 6,367,952 | B1 | 4/2002 | Gibboney, Jr. | |
| 6,383,013 | B1 | 5/2002 | Ghesla et al. | |
| 6,478,450 | B1 | 11/2002 | Grajcar | |
| 6,558,021 | B1 * | 5/2003 | Wu et al. | 362/249 |
| 6,578,986 | B1 | 6/2003 | Swaris et al. | |
| 6,660,935 | B1 * | 12/2003 | Southard et al. | 362/640 |
| 6,942,360 | B1 | 9/2005 | Chou et al. | |
| 2003/0063463 | A1 * | 4/2003 | Sloan et al. | 362/238 |
| 2004/0075399 | A1 | 4/2004 | Hall | |

FOREIGN PATENT DOCUMENTS

WO WO 02/097770 A2 12/2002

OTHER PUBLICATIONS

U.S. Appl. No. 10/819,328.
U.S. Appl. No. 10/820,838.

* cited by examiner

FIG. 7
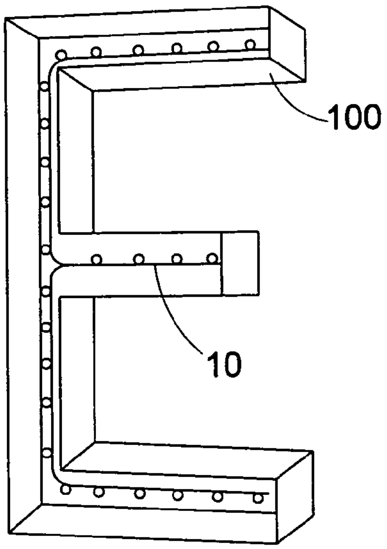
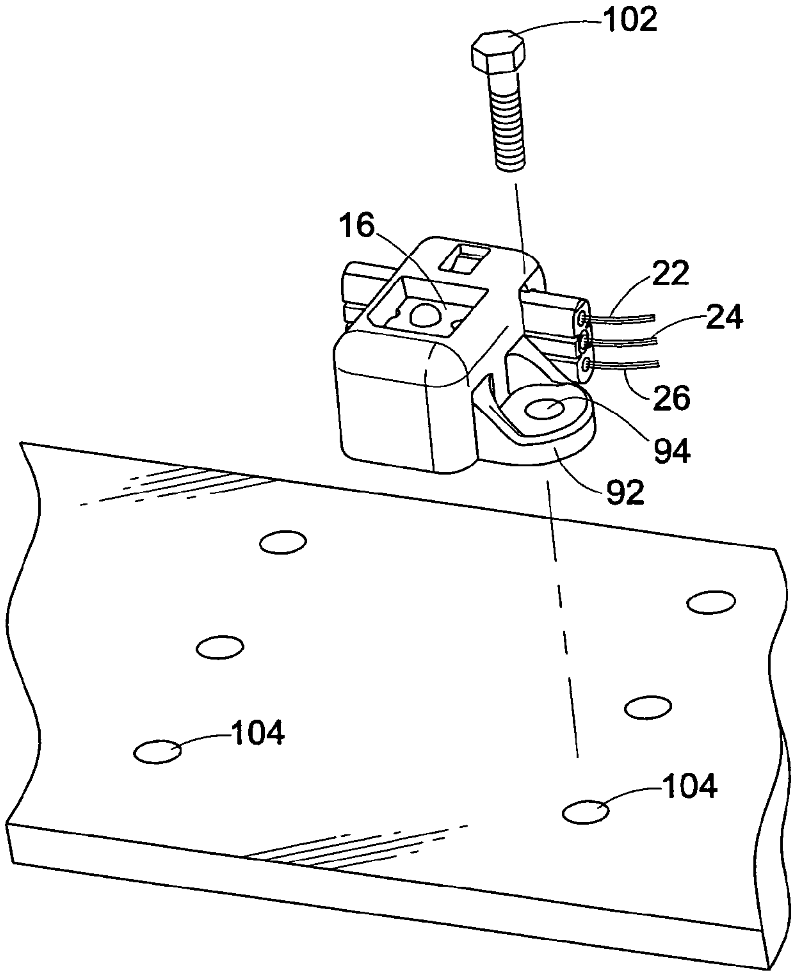
FIG. 8

PARALLEL/SERIES LED STRIP

BACKGROUND OF THE INVENTION

Light emitting diodes ("LEDs") are employed as a basic lighting structure in a variety of forms, such as outdoor signage and decorative lighting. LED-based light strings have been used in channel lettering systems, architectural border tube applications, under cabinet lighting applications and for general illumination. A known spoolable LED light string arranges the LEDs in parallel circuitry. This parallel arrangement requires a very low voltage output power supply ($V_{out}$ approximately 2.0 to 4.5 VDC) and a large amount of drive current capability. The large currents that must be delivered severely limits the distance that the power supply can be spaced from the LED strip as well as the length of the LED strip that can be driven by the power supply.

Known LED string lights also use parallel/series combinations of LEDs. These known systems require that the LEDs mount to a printed circuit board as well as some sort of current limiting device. These known systems require the printed circuit board to be environmentally isolated, which is expensive. Furthermore, the printed circuit board based systems are also difficult to spool, to mount and to cut to length in addition to requiring the expense of the printed circuit board itself.

Other known LED light strings employ a plurality of LEDs wired in a series/parallel block that are run directly off AC power. These known systems require complicated designs to account for the alternating current.

The present LED light engine contemplates an improved apparatus and method that overcomes the above-mentioned limitations and others.

SUMMARY OF THE INVENTION

An LED light engine includes a flexible electrical cable and a plurality of LEDs. The flexible electrical cable includes first, second and third electrical conductors and an electrically insulating covering for the electrical conductors. The conductors are arranged substantially parallel with one another having an insulating material therebetween. A first LED including a first lead electrically connects to the first electrical conductor and a second lead of the first LED electrically connects to the second conductor. A second LED includes a first lead electrically connected to the second electrical conductor and a second lead electrically connected to the third electrical conductor. A third LED includes first and second leads electrically connected to the second conductor. The third LED is interposed between the first LED and the second LED.

A method of manufacturing an LED light engine is disclosed. The method includes insulating first, second and third conductive elements to form an insulated conductor. The insulated conductor includes insulating material interposed between the conductive elements. The method further includes mechanically securing a plurality of LEDs spaced along the insulated conductor. The method further includes electrically contacting a first lead of a first LED of the plurality of LEDs to the first conductive element and a second lead of the first LED to the second conductive element. The method further includes electrically contacting a first lead and a second lead of a second LED of the plurality of LEDs to the second conductive element. The method further includes electrically separating the second conductive element between the first lead and the second lead of the second LED. The method further includes electrically contacting a first lead of a third LED of the plurality of LEDs to the second conductive element and a second lead of the third LED to the third conductive element. The second LED is interposed between the first LED and the third LED.

A light string includes a plurality of LEDs connected to one another in parallel, a predetermined number of LEDs electrically connected to one another in series, and conditioning electronics in electrical communication with the plurality of LEDs. The predetermined number of LEDs is electrically interposed between adjacent LEDs that are electrically connected to one another in parallel. The conditioning electronics convert AC power to DC power for driving the LEDs.

BRIEF DESCRIPTION OF THE FIGURES

FIG. 7 is a view of the light engine of FIG. 1 mounted in a channel letter.

FIG. 8 is a close-up view of the light engine of FIG. 1 mounted to a mounting surface such as the channel letter of FIG. 7.

DETAILED DESCRIPTION

Figure 1:
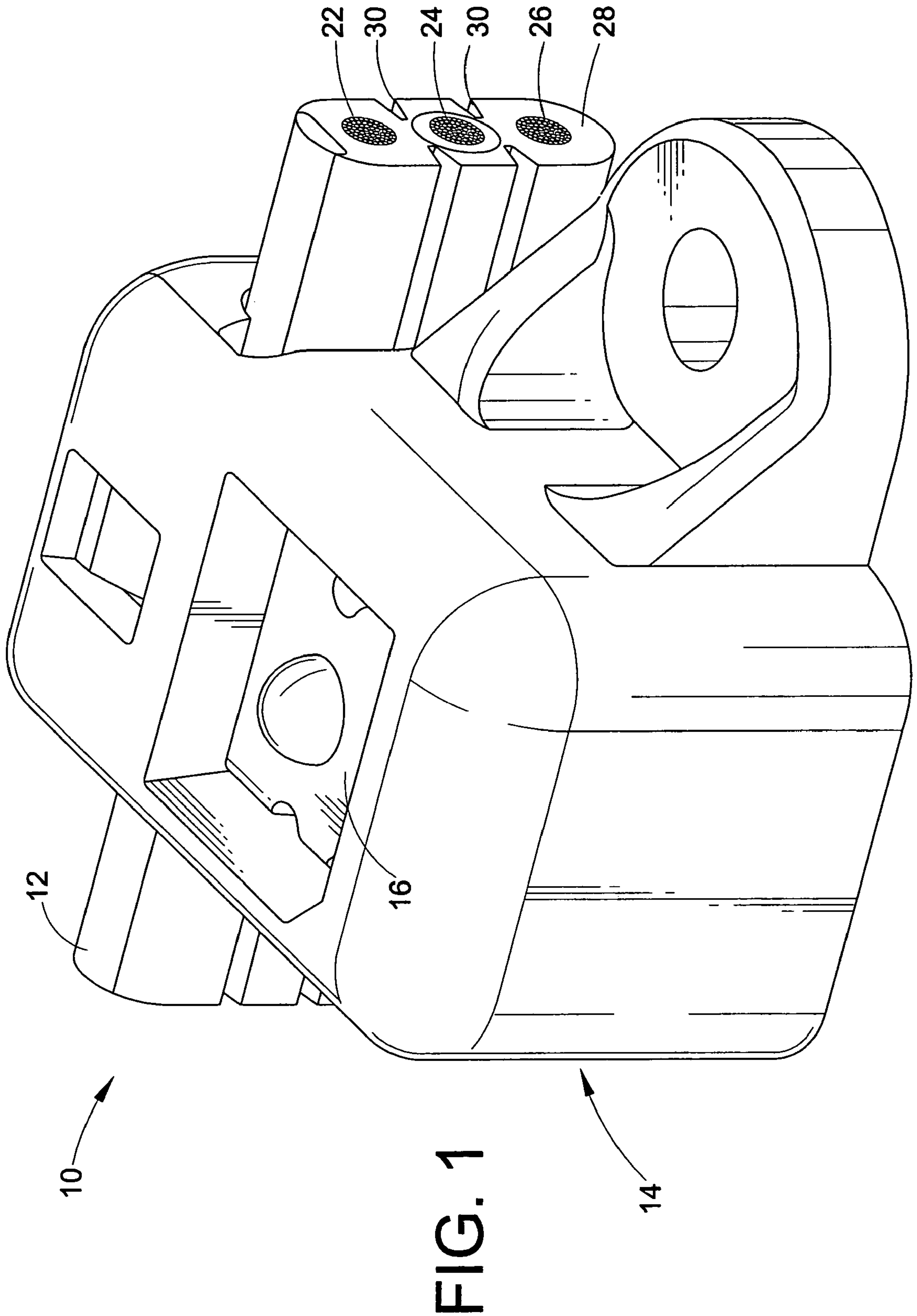
FIG. 1 is a perspective view of a portion of an LED light engine.
Figure 5:
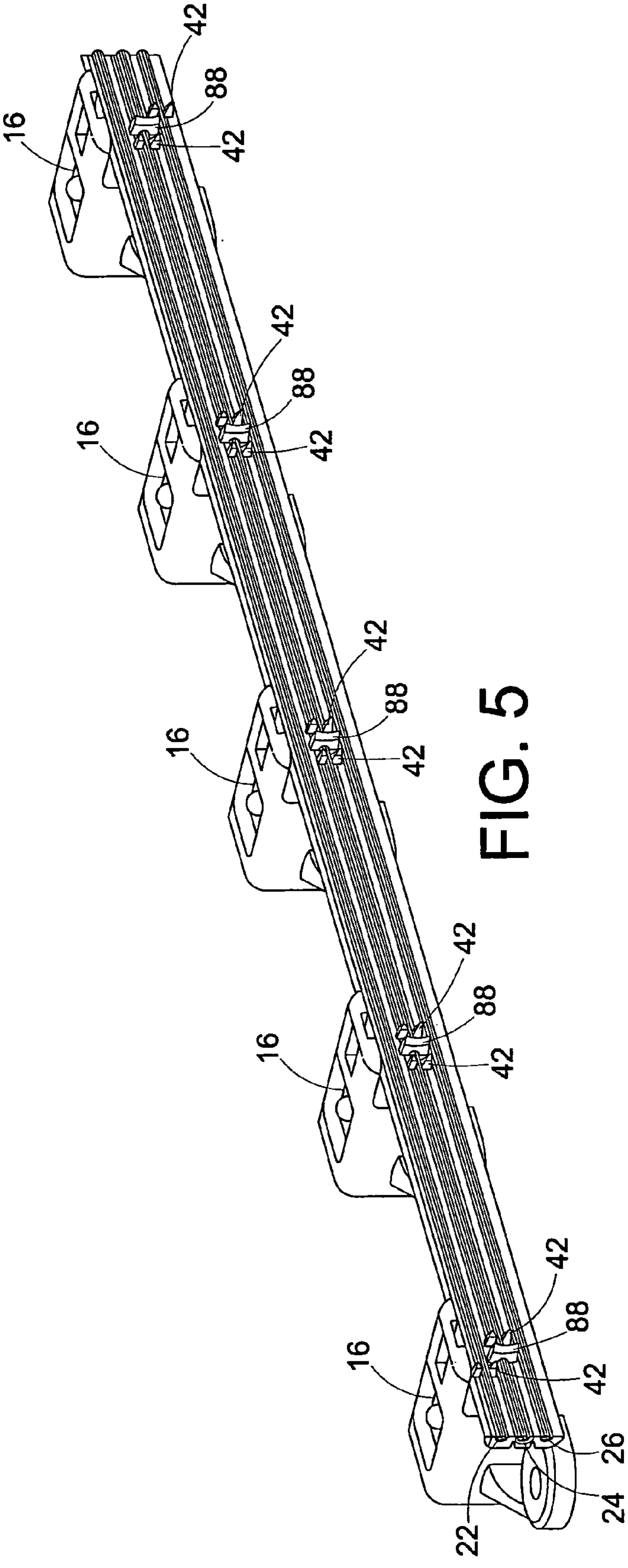
FIG. 5 is a perspective view of the LED light engine of FIG. 1 showing a plurality of LEDs attached to the flexible electrical cable, where the cable is shown in cross section.

With reference to FIG. 1, a light engine 10 includes a flexible electrical conductor 12 having a socket housing 14 attached thereto. The socket housing 14 receives a light source, which in this embodiment is an LED 16. The LED 16 is a pre-packaged LED of a type known to the art, e.g., an electroluminescent semi-conducting element arranged in a P4 (piranha) package with suitable epoxy or other encapsulant 18. Other conventional light sources can be used with the light engine 10 including an incandescent light source. A plurality of socket housings 14 can attach to the insulated flexible electrical cord 12 at a plurality of locations along the cord, as seen in FIG. 5, to form a light strip or light string.

The light strip, in a preferred embodiment, is powered by AC power. In one embodiment, conditioning electronics 20 (FIG. 5) communicate through the insulated flexible electrical cord 12 with the LEDs 16. The conditioning electronics convert building power (e.g., 120 VAC in the United States or 220 VAC in Europe) to power suitable for driving the LEDs 16 of the light strip 10. In a preferred embodiment, the conditioning electronics include a class II power supply having output power limited to 5 amperes and 30 volts. Class II power supplies are relatively safe due to the low voltages and currents produced and typically are not required by electrical codes to be arranged in safety conduits.

The insulated flexible electric cord 12 includes a first conductor 22, a second conductor 24 and a third conductor 26. Each of the conductors 22, 24 and 26 is preferably sized to be about 18 gauge. Additionally, each conductor is preferably stranded and includes a plurality of strands (e.g., seven strands). With a current running through the flexible electrical cord 12, the first conductor 22 can be referred to as the positive (+) conductor, the third conductor can be referred to as the negative (−) conductor, and the second conductor 24 can be referred to as the series conductor. Each of the conductors is situated generally parallel to one another and an insulating material 28 (e.g., rubber, PVC, silicone and/or EPDM), is situated between the conductors.

The electrical cord 12 can include an alignment mechanism to facilitate alignment of the socket housing 14 on the electrical cord. In a preferred embodiment, the alignment mechanism is two grooves 30, which have a V-shaped configuration, into which a portion of the socket housing 14 can be received. Alignment of the socket housing 14 with the grooves 30 aligns the internal components located in the socket housing, which will be described in more detail below, with the electrical conductors 22, 24 and 26 in the cord 12 to promote a good electrical connection. In alternative embodiments, the alignment mechanism can include a line drawn or made on the cord, or any conventional indicia to facilitate location of the socket housing 14 on the electrical cord.

Figure 2:
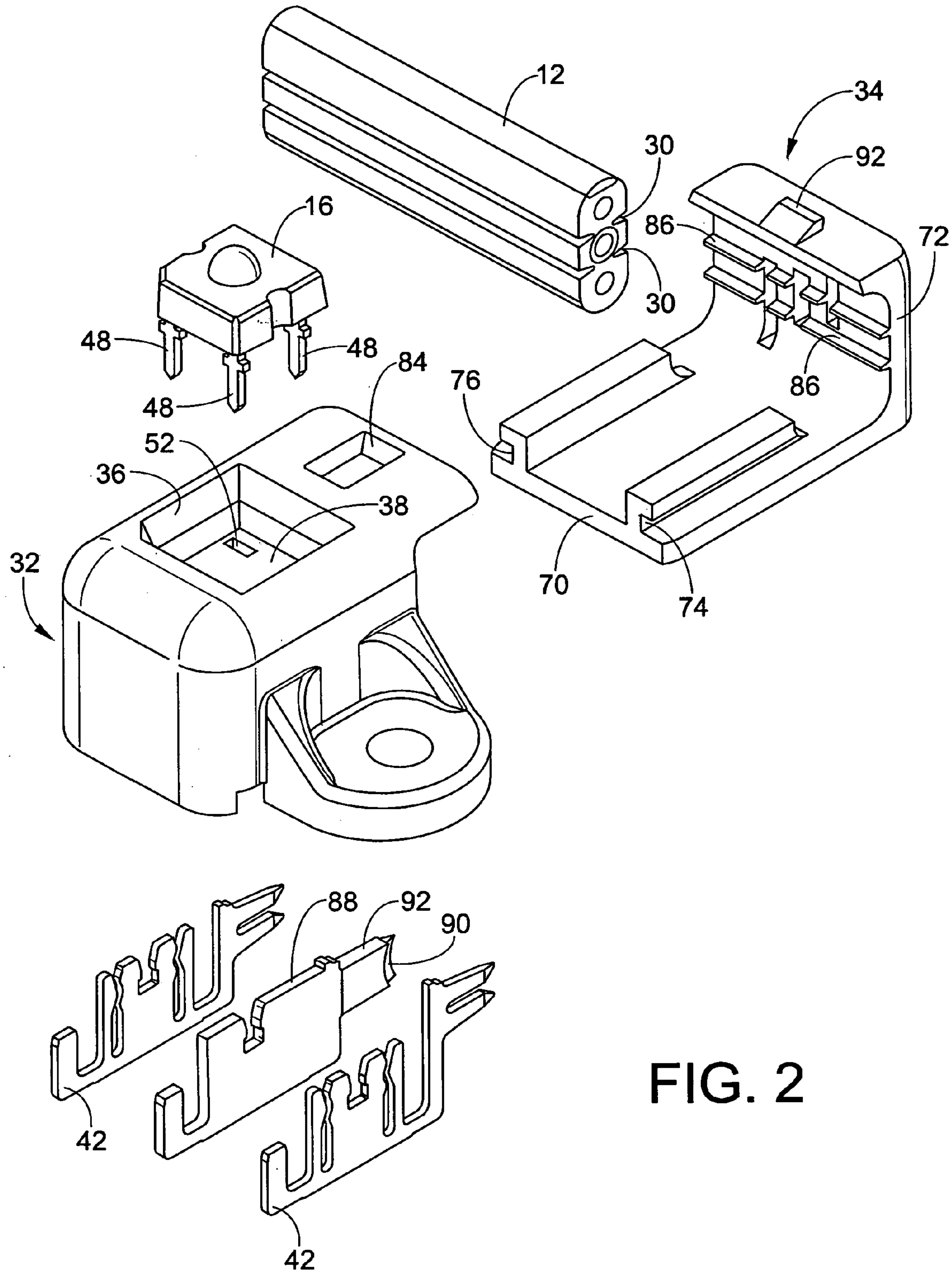
FIG. 2 is an exploded perspective view of the LED light engine of FIG. 1.

The socket housing 14 attaches to the insulated flexible electrical cord 12. In a preferred embodiment, the socket housing is a molded body of a plastic or other suitable electrically insulating material. With reference to FIG. 2, the socket housing 14 includes two sections: a hollow socket body 32 and a socket cover 34. The socket body 32 is generally box-shaped and defines an LED seat 36 on an upper surface thereof. The LED seat 36 is dimensioned to receive a correspondingly sized LED 16. The seat 36 includes a platform 38 upon which the LED 16 rests. The socket body 32 is hollow so that it can receive prongs 42 inside the socket body and below the LED platform 38.

Figure 3:
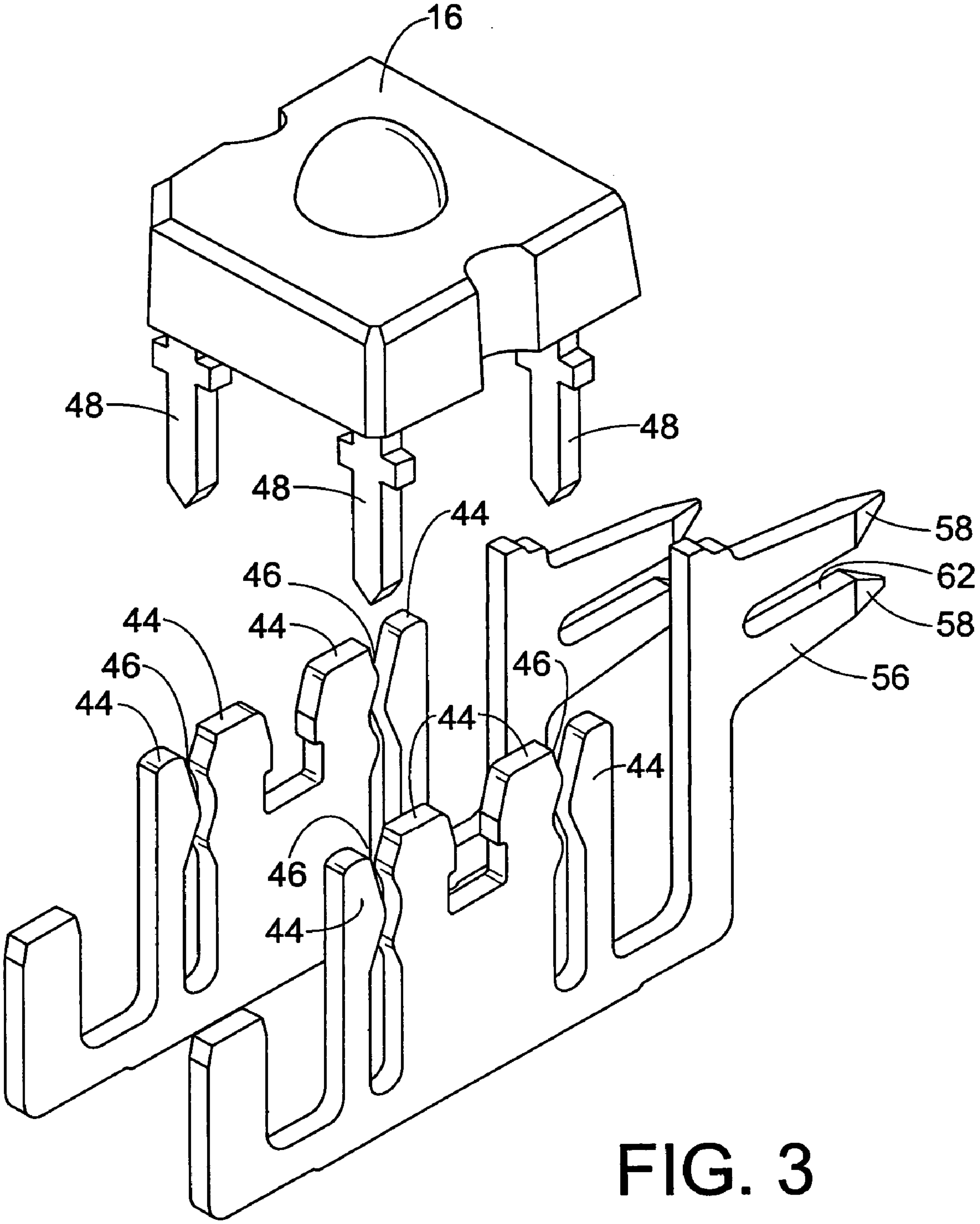
FIG. 3 illustrates insulation-piercing members of the LED light engine of FIGS. 1 and 2, and their interconnection with LED leads inside a socket housing (the socket housing is not shown in FIG. 3).

The prongs 42 include insulation-piercing members that are arranged in a substantially fixed manner in slots or openings (not shown) in the socket body 32. The prongs 42 are formed from sheet metal or another suitably electrically conductive material. With reference to FIG. 3, each prong 42 is substantially planar and includes fingers 44 that extend towards the LED platform 38 to define slots 46 that receive corresponding LED leads 48 to effectuate electrical contact of the positive and negative terminals (anode and cathode) of the LED 16 with the corresponding positive or negative prong. The LED platform 38 includes openings 52 (only one is visible in FIG. 2) through which the terminals 48 protrude before entry into the slots 46 of the prongs 42. Receiving of the LED leads 48 into the slots 46 does not include a soldering step. Hence, the LED 16 is optionally detachable from the prong 42 and the socket body 32, for example to facilitate replacement of a failed LED.

Figure 4:
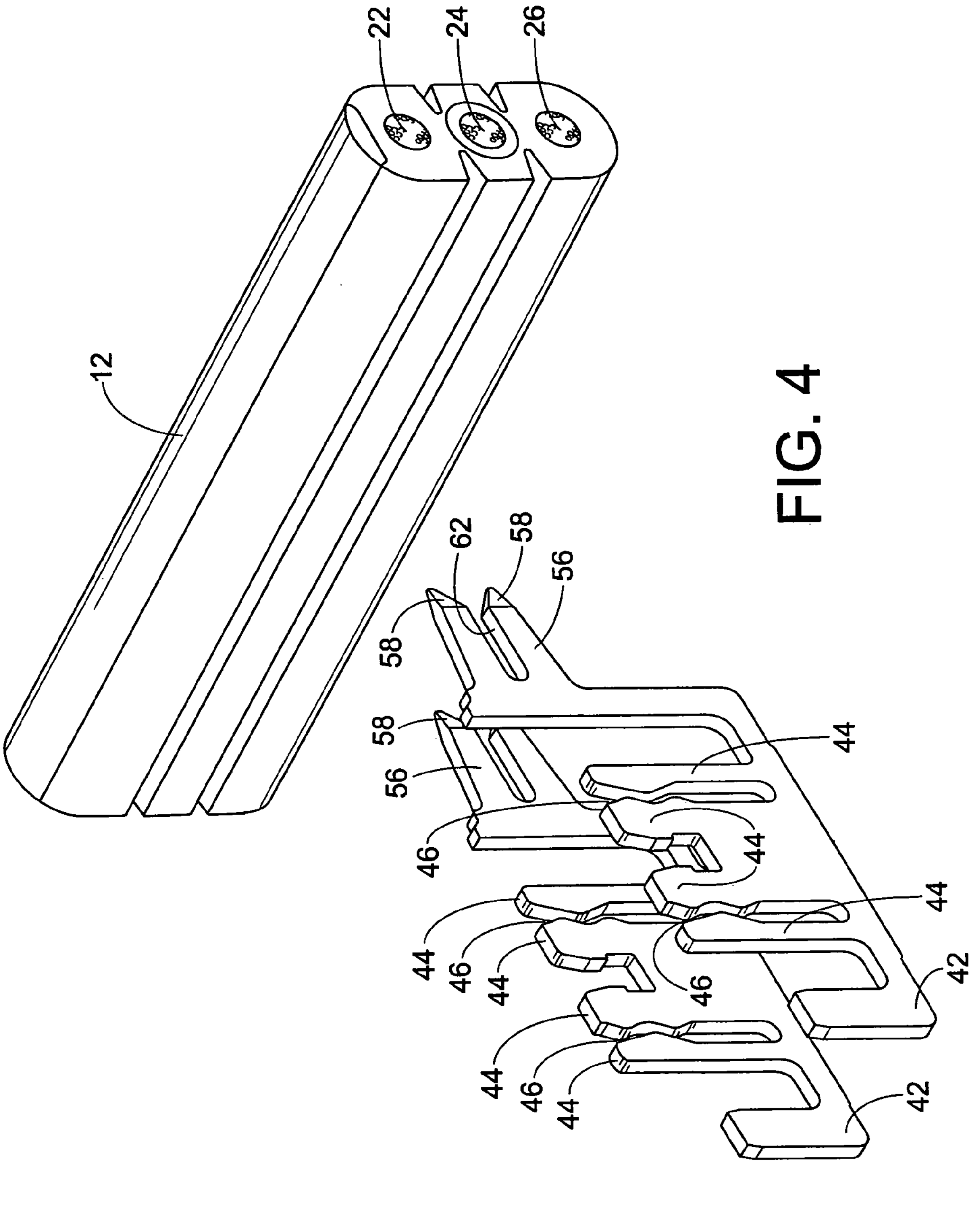
FIG. 4 illustrates connecting of the insulation-piercing members with conductors of a flexible electrical cable.

With continued reference to FIGS. 2 and 3, each prong 42 includes a bifurcated portion 56 that extends out of the socket body 32 toward the socket cover 34 such that when the socket body 32 is fastened to the socket cover 34 with the cable 12 sandwiched therebetween the bifurcated portion 56 of the prongs 42 punctures the cable insulation 28 and contacts a respective conductor 22, 24 or 26. Points 58 are formed at the end of the bifurcated portion to facilitate puncturing of the insulating material 28. Each bifurcated portion 56 defines a gap 62 dimensioned to receive a respective conductor 22, 24 or 26. With reference to FIG. 4, each conductor 22, 24 or 26 compressively squeezes into the gap 62 of one of the prongs 42 when the socket body 32 is connected to the socket cover 34. The compression preferably does not break or fracture the individual strands of the conductors, but does ensure a reliable electrical contact between the prongs 42 and a respective conductor 22, 24 or 26.

The snapping connection of the socket body 32 and the socket cover 34 about the cable 12 effectuates both a mechanical connection of the LED 16 to the cable 12 as well as a simultaneous electrical connection of the positive and negative (anode and cathode) terminals of the LED 12 via the prongs 42 to the conductors 22, 24 or 26 that supply electrical power. With reference back to FIG. 2, the socket cover 34 is generally L-shaped and includes a base 70 that closes off the bottom of the socket body 32 and an upwardly extending wall 72 that covers the opposite side of the electrical cord 12 as the socket body 32. The base 70 includes a first channel 74 located on one side of the base and a second channel 76 located on an opposite side of the base the channels 74 and 76 receive tongues (not visible in FIG. 2) that fit into the channels when the socket body 32 is fastened to the socket cover 34.

The upwardly extending wall 72 includes a knurl 82 positioned above the electrical cord 12 when the socket body 32 attaches to the socket cover 34. The knurl 82 engages an opening 84 located on the socket body 32. The knurl and opening provide a selective engagement between the socket body 32 and the socket cover 34; however, the socket body and the socket cover can secure to one another in any conventional manner. The wall 72 also includes alignment members 86 that are received in the grooves 30 of the electrical cord 12. The alignment members 86 further align the socket housing 14 in a direction generally perpendicular to the length of the electrical cord 12. With reference back to FIG. 2, an insulating member 88 is positioned between the prongs 42 to puncture the insulating material 28 and separate (e.g. cut) the series conductor 24 upon connection of the socket body 32 to the socket cover 34. The insulating member 88 mounts inside the socket body 32 in a similar manner to the prongs 42. The insulating member 88 includes a blade 90 to cut through the insulating material 28 and the series conductor 24. The insulating member 88 is flat, similar to the prongs 42, however, the insulating member 88 includes a dielectric material 92 positioned to prohibit the flow of electricity through the deflective material 92 when the socket housing 14 is affixed to the electrical cord 12.

In an alternative embodiment, the wall 72 can also include an insulation barrier (not shown) that is aligned to fit between the prongs 42 and separate the series conductor 24 between the prongs 42 when the socket body 32 attaches to the socket cover 34. The insulation barrier can comprise a dielectric material that can puncture through the insulating material 28 of the electrical cord 12 and also cut through the series conductor 24 thus electrically separating the series conductor between two adjacent prongs 42. In an alternative embodiment, the series conductor 24 can be cut by a feature integral to the socket body 32 and this feature can also electrically separate the series conductor 24 between two adjacent prongs 42. In yet another alternative embodiment, a secondary component can be inserted into the socket housing 14, i.e., through an opening (not shown) in the socket cover 34.

A mounting portion 94 also attaches to the socket housing 14. The mounting portion in the light engine depicted in FIG. 2 includes an opening 96 that is adapted to receive a fastener. The mounting portion allows the socket housing 14 and thus the light engine 10 to attach to an associated surface such as a portion of outdoor signage, channel lettering systems, architectural border tube applications, under cabinet lighting applications and any surface to which one may want to mount a light engine. The light engine 10 can mount to the associated surface in other conventional manners including tape, hook and loop fasteners, as well as having a mounting portion that takes other configurations that the hook has shown.

The mechanical connection between the socket housing 14 and the electrical cord 12 facilitates placement of the light engine 10 in a channel letter 100. As seen in FIG. 1, the LED 16 is generally perpendicular a plane that intersects the conductors 22, 24 and 26. Such a configuration allows for easy manipulation of the light string 10 on a mounting surface into a variety of configurations while emitting light away from the mounting surface. With reference to FIG. 7, the light engine 10 mounts inside a channel letter 100. A protective translucent cover (not shown) encloses the light engine 10 in the channel letter 100. With reference to FIG. 8, the light engine 10 mounts to the channel letter 100 by fasteners 102 received in the slots 94 of the mounting portion 92 and in openings 104 formed in the channel letter 100. In addition to using fasteners, the light engine 10 can mount to the channel letter, or another mounting surface, in any conventional manner including clips, hook and loop fasteners, tape, glue and the like.

The electrical connection between the components of the light engine 10 need not include auxiliary electrical components, such as resistors and the like, and need not include soldering. Preferably, the conductors 22, 24 and 26, the prongs 42 and the LED leads 48 are formed from substantially similar metals to reduce galvanic corrosion at the electrically contacting interfaces, or are coated with a conductive coating that reduces galvanic corrosion at the interfaces.

Figure 6:
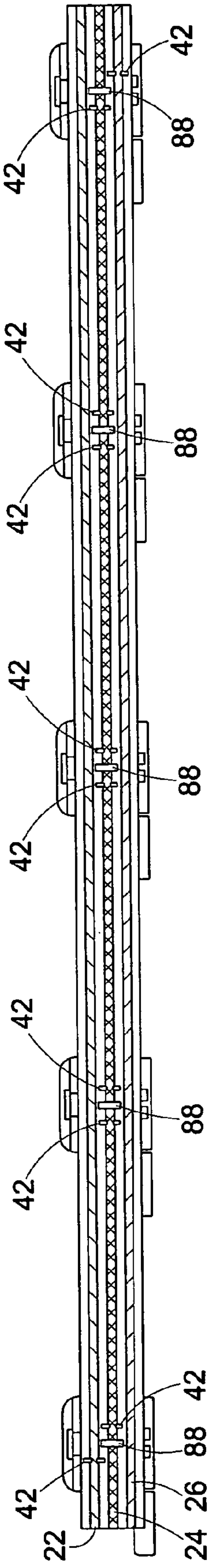
FIG. 6 is an elevation view of FIG. 5.

The orientation of the prongs 42 inside the socket body 32 is dependent upon the location of the socket housing 14 along the electrical cord 12. As best shown in FIGS. 5 and 6, the location of each bifurcated portion 56 of the prongs 42 is dependent upon the location of LED on the electrical cord 12. As shown in FIG. 5, the left-most LED 16 is electrically connected to the positive conductor 22 and the series conductor 24. The right-most LED 16 is electrically connected to the negative conductor 26 and the series conductor 24. The left-most LED and the right-most LED each have their prongs 42 offset from one another along the electrical cord 12 and the conductors 22, 24 and 26 running within. The prongs 42 are also offset perpendicular to the length of the electrical cord 12 so that each prong contacts a different conductor. The central LEDs, which are interposed between the left-most and right-most LEDs, have leads 48 that attach to prongs 42 to the second or series conductor 24. The central LEDs have their prongs offset only along the length of the series conductor 24. Also, the insulating member 88 cuts through the series conductor 22 between each pair of prongs 42 for each LED 16.

Figure 9:
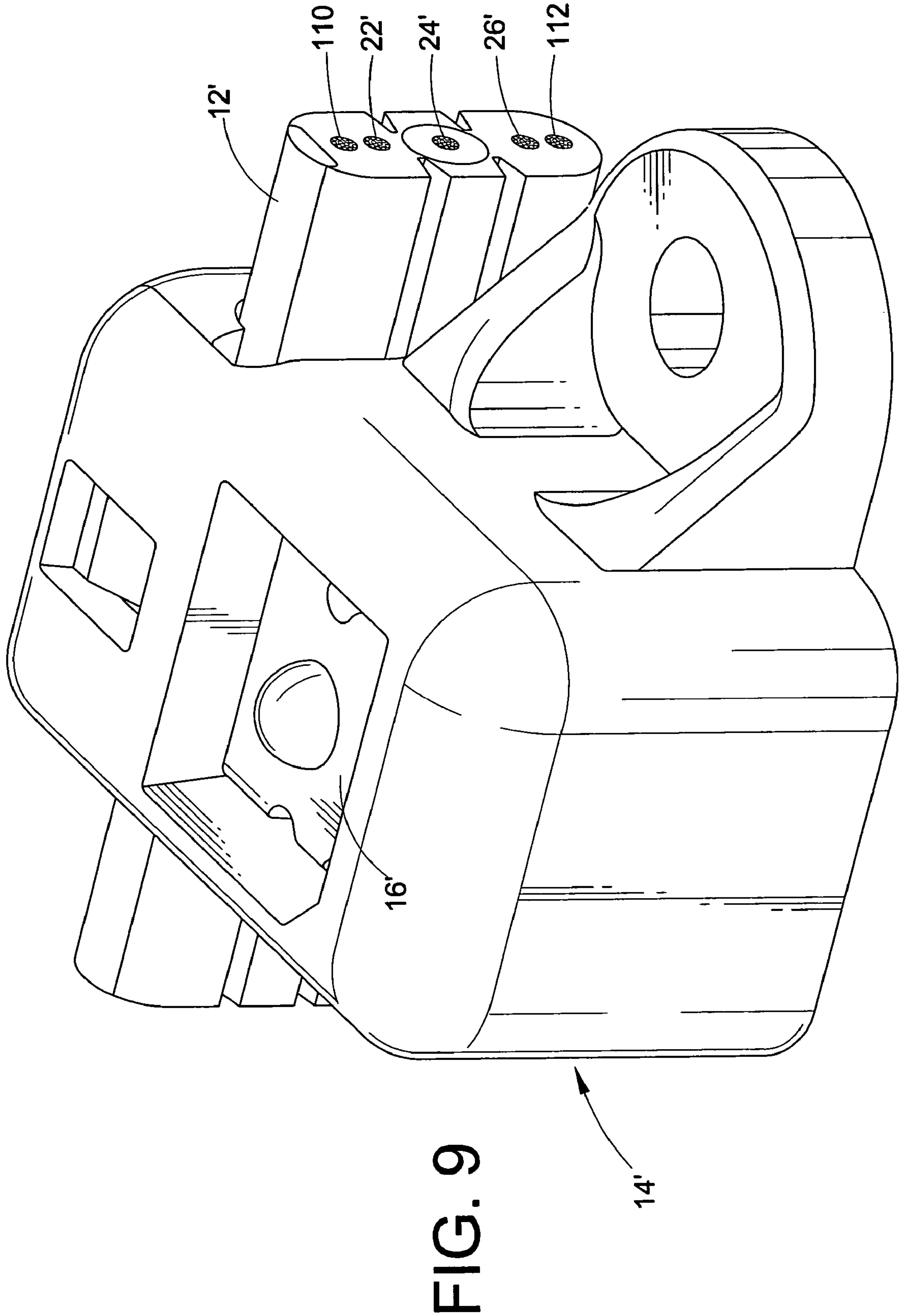
FIG. 9 is a perspective view of a portion of an alternative LED light engine.

With reference to FIG. 9, a cord 12' can include additional wires or conductors. The cord 12' includes a positive conductor 22', a series conductor 24' and a negative conductor 26'. The cord 12' also includes additional wires 110 and 112. These wires can also communicate with an LED 16' housed in a socket body 14' which is attached to the cord. Information can be passed along the additional wires 110 and 112. In such a case the wires 110 and 112 would also communicate with a control center. The additional wires can allow for dimming an LED in the string separately from other LEDs, perhaps due to a higher current draw. Other control examples that can be run through the additional wiring include sequencing LED's to create active effects, probing the LED socket for lifetime information, passing diagnostic information back and forth, reading temperature data from the socket (via electronics, thermocouples, or current and voltage characteristics), real time feedback to a power supply of voltage and current usage to allow for immediate modification of drive current or voltage, and addressing a resistive load at the module to allow for slight modifications to affect drive current. Furthermore, even though only two additional wires are depicted in FIG. 6, it is contemplated that many more wires can be added to allow for the communication of information between the LEDs and the wires.

A light engine 10 that has a parallel and series electrical configuration has been described. The conditioning electronics 20 allow DC power to run the LEDs 14, allowing for a less complicated design. Furthermore, due to the electrical configuration, current limiting resistors are not required in the light engine. Also, by connecting some of the LEDs in series, the amount of current required to drive the light engine can be lessened.

The light engine has been described with reference to the preferred embodiments. Obviously, modifications and alterations will occur to others upon reading and understanding the preceding detailed description. As just one example, the light engine was described with particular reference to LEDs; however, as indicated above, the light source can be any conventional light source, including incandescent bulbs. It is intended that the light engine be construed as including all such modifications and alterations insofar as they come within the scope of the appended claims or the equivalents thereof.

The invention claimed is:

1. A light emitting diode (LED) light engine comprising:

a flexible electrical cable including first, second and third electrical conductors, a wire disposed the cable for delivering information through the cable and an electrically insulating covering material for the electrical conductors and the wire, the conductors and the wire having the insulating covering material therebetween and the wire providing communication between an associated controller and at least one of the LEDs;

a plurality of LEDs including a first LED having a first lead electrically connected to the first electrical conductor and a second lead electrically connected to the second conductor, a second LED having a first lead electrically connected to the second electrical conductor and a second lead electrically connected to the third conductor, and a third LED having first and second leads electrically connected to the second conductor, wherein the third LED is interposed between the first LED and the second LED;

a plurality of prongs wherein each prong is in electrical communication with a respective lead of one of the LEDs, wherein each prong includes a tip adapted to pierce the insulating material of the flexible electrical cable; and power conditioning electronics electrically connected to the first and third conductors, wherein the power conditioning electronics are adapted to convert AC power to DC power.

2. The light engine of claim 1, further comprising a plurality of socket housings mechanically affixed to the flexible cable, wherein each socket housing receives at least one of the LEDs.

3. The light engine of claim 2, wherein each socket housing receives at least one of the prongs.

4. The light engine of claim 2, further comprising a mounting portion for allowing the light engine to mount to an associated structure, wherein the mounting portion is attached to the socket housing.

5. The light engine of claim 2, wherein at least one of the socket housings includes a first section that selectively fastens to a second section, wherein the flexible cable is sandwiched between the first section and the second section such that a plane that intersects each of the electrical conductors is substantially perpendicular to a plane in which the LED that is received in the at least one socket resides.

6. The light engine of claim 2, wherein at least one of the socket housings includes a member adapted to puncture the electrically insulating covering material and electrically separates the second electrical conductor when the first section is fastened to the second section, whereby preventing electricity from flowing through the second electrical conductor.

7. The light engine of claim 1, further comprising an insulation barrier that separates the second electrical conductor to prevent an electrical connection between the first and second leads through the second electrical conductor.

8. The light engine of claim 1, further comprising a plurality of wires disposed in the electrical cable, wherein each wire is in communication with a controller and at least one of the LEDs.

9. The light engine of claim 1, further comprising a further plurality of LEDs each including electrical leads connected to the second wire, wherein the further plurality of LEDs are interposed between the first LED and the second LED.

10. A light string comprising:

a flexible electrical cable including a pair of parallel conductors, a continuous series conductor and an electrically insulating material covering for the electrical conductors, the conductors having the insulating material therebetween;

a first plurality LEDs mechanically affixed to the cable and electrically connected to one another in parallel; and a second plurality of LEDs mechanically affixed to the cable and interposed between two adjacent LEDs of the first plurality of LEDs, wherein the second plurality of LEDs are electrically connected to one another in series.

11. The light string of claim 10, further comprising conditioning electronics in electrical communication with the plurality of LEDs, wherein the conditioning electronics convert AC power to DC power for driving the LEDs.

12. The light string of claim 10, wherein the series conductor is interrupted by an insulated barrier at a plurality of locations along the series conductor.

13. The light string of claim 12, wherein the insulated barrier comprises a dielectric material adapted to cut through the series conductor.

14. The light string of claim 10, further comprising an additional wire disposed in the flexible electrical cable, wherein the additional wire is in communication with at least one of the LEDs.

15. A light emitting diode (LED) light engine comprising:

a flexible electrical cable including first, second and third electrical conductors and an electrically insulating covering material for the electrical conductors;

a first socket housing mechanically affixed to the flexible cable;

a first LED received in the first socket housing and electrically connected to the first electrical conductor and the second conductor;

a second socket housing mechanically affixed to the flexible cable;

a second LED received in the second socket housing and electrically connected to the second electrical conductor and the third conductor;

a third socket housing mechanically affixed to the flexible cable;

a third LED received in the third socket housing and electrically connected to the second conductor at a first location and a second location that is spaced from the first location along the second conductor, the third LED being interposed between the first LED and the second LED; and an insulation member disposed between the first location and the second location that separates the second electrical conductor to prohibit flow of electricity.

16. A channel letter including the light engine of claim 15.

17. The light engine of claim 15, further comprising:

a fourth socket housing mechanically affixed to the flexible cable;

a fourth LED received in the fourth socket housing and electrically connected to the second conductor at two locations that are spaced from one another along the second conductor, the fourth LED being interposed between the first LED and the second LED.

18. The light engine of claim 15, further comprising insulation-piercing members disposed in the socket housings, the insulation-piercing members electrically connecting a respective LED to a respective electrical conductor.

19. The light engine of claim 15, power conditioning electronics electrically connected to the first and third conductors, the power conditioning electronics being configured to convert AC power to DC power.

20. The light engine of claim 15, further comprising a wire disposed in the flexible electrical cable.

* * * * *